(12) United States Patent
Gigliotti

(10) Patent No.: US 10,165,036 B1
(45) Date of Patent: Dec. 25, 2018

(54) NETWORK RESOURCE REMOTE PROCESS EXECUTION

(75) Inventor: Samuel S. Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 366 days.

(21) Appl. No.: 13/333,716

(22) Filed: Dec. 21, 2011

(51) Int. Cl.
*H04L 15/16* (2006.01)
*H04L 29/08* (2006.01)

(52) U.S. Cl.
CPC ................. *H04L 67/02* (2013.01)

(58) Field of Classification Search
CPC ...... G06F 9/547; G06F 9/5055; G06F 9/5027; H04L 67/02
USPC ......................................................... 709/203
See application file for complete search history.

(56) References Cited

U.S. PATENT DOCUMENTS

| 5,898,835 | A  | * | 4/1999  | Truong .......................... 709/217 |
| 8,321,558 | B1 | * | 11/2012 | Sirota et al. ................... 709/224 |
| 8,621,075 | B2 | * | 12/2013 | Luna .................... H04L 67/1095 709/203 |
| 8,903,954 | B2 | * | 12/2014 | Luna ........................ H04L 67/04 709/203 |
| 9,106,514 | B1 | * | 8/2015  | Kanadam ................ H04L 43/04 |
| 2001/0049713 | A1 | * | 12/2001 | Arnold ................... G06F 9/5044 718/105 |
| 2002/0073146 | A1 | * | 6/2002  | Bauer et al. .................... 709/203 |
| 2003/0005110 | A1 | * | 1/2003  | Corbin .................. G06F 11/324 709/224 |
| 2006/0184626 | A1 | * | 8/2006  | Agapi ..................... G06F 9/505 709/205 |
| 2007/0073732 | A1 | * | 3/2007  | Kahn et al. ...................... 707/10 |
| 2007/0180450 | A1 | * | 8/2007  | Croft ..................... G06F 3/1415 718/1 |
| 2007/0198656 | A1 | * | 8/2007  | Mazzaferri ........... G06F 3/1415 709/218 |
| 2008/0209008 | A1 | * | 8/2008  | Kim .................... H04L 12/2809 709/219 |
| 2009/0199160 | A1 | * | 8/2009  | Vaitheeswaran et al. .... 717/124 |
| 2009/0276115 | A1 | * | 11/2009 | Chen ............................... 701/32 |
| 2009/0313602 | A1 | * | 12/2009 | Khandelwal ........ G06F 17/3089 717/111 |
| 2010/0223385 | A1 | * | 9/2010  | Gulley et al. .................. 709/226 |
| 2011/0046956 | A1 | * | 2/2011  | Auburn ............... H04M 3/4938 704/260 |

(Continued)

*Primary Examiner* — Farzana B Huq
(74) *Attorney, Agent, or Firm* — Lee & Hayes, PLLC

(57) ABSTRACT

In some implementations, a client device receives a network resource from a network resource provider. During rendering or other processing of the network resource on the client device, the network resource may cause the client device to send a request for a remote process to be executed by a network computing provider. For example, the network resource may include information to establish communication between the client device and the network computing provider for the client device to send a remote processing request. In response to the remote processing request, the network computing provider may obtain and execute remote process information related to the remote process. For example, the remote process information may be provided by the network resource provider and may include executable instructions to be executed by the network computing provider, and may further include data to be used during execution of the remote process.

32 Claims, 9 Drawing Sheets

(56) References Cited

U.S. PATENT DOCUMENTS

| | | | |
|---|---|---|---|
| 2011/0196914 A1* | 8/2011 | Tribbett | G06F 9/541 709/203 |
| 2013/0054675 A1* | 2/2013 | Jenkins et al. | 709/203 |
| 2013/0055072 A1* | 2/2013 | Arnold | G06T 15/503 715/240 |
| 2013/0073601 A1* | 3/2013 | Jenkins et al. | 709/201 |
| 2013/0080577 A1* | 3/2013 | Taylor et al. | 709/217 |
| 2013/0086594 A1* | 4/2013 | Cottrell | H04L 67/16 719/313 |
| 2015/0222692 A1* | 8/2015 | Jenkins | G06F 21/55 709/203 |

* cited by examiner

NETWORK RESOURCE REMOTE PROCESS EXECUTION

BACKGROUND

A computing device may execute processes that include a plurality of computer-readable instructions to cause the computing device to perform a variety of functions or actions. However, some types of computing environments only permit a single process or function to execute at any one time. Further, other types of computing environments may permit multiple processes to execute contemporaneously, but may not have sufficient computing device resources to support the contemporaneous execution of all the desired processes. In either of these situations, a user may experience a delay or lack of responsiveness. Such latencies and inefficiencies may be particularly apparent on mobile devices or other computing devices having limited resources, such as limited processing power, memory, storage or network connectivity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Remote Process Execution

Figure 1:
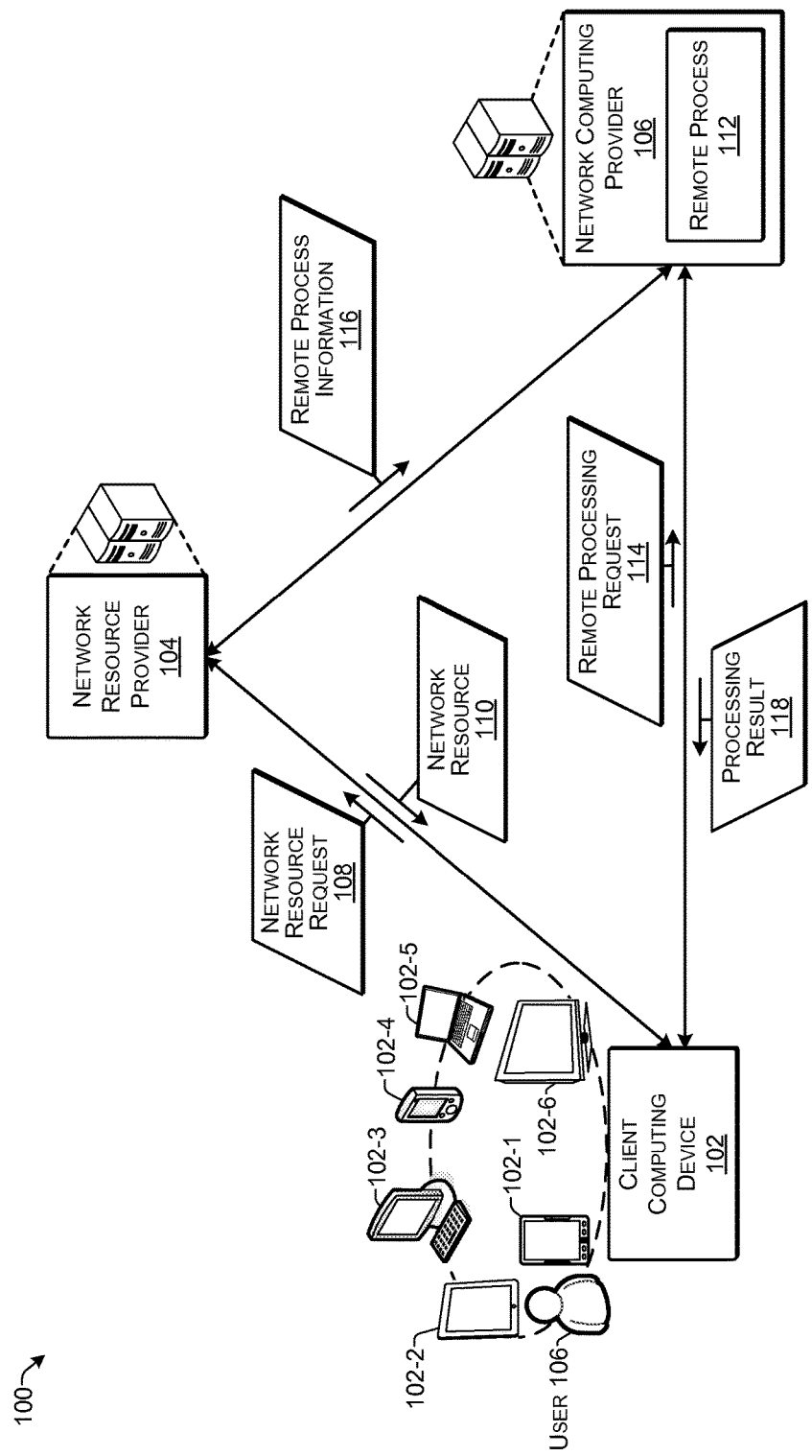
FIG. 1 illustrates an example framework for remote process execution according to some implementations.

This disclosure includes techniques and arrangements for remote process execution. In some implementations, a remote software process may be employed to generate process data or other processing results between a client computing device and a network computing provider. For example, a network resource provider may provide remote process execution information to a network computing provider in connection with providing a network resource to a client computing device. The client computing device may invoke the remote process on the network computing provider. The network computing provider may obtain executable instructions for the remote process from the network resource provider, execute the remote process and provide a processing result to the client computing device. The client computing device may receive the processing result and apply the processing result to processing on the client in association with the network resource. The techniques disclosed herein may be applied to any number of software processes including, but not limited to, browser processes and services, or any other application, operating system, computer program or executable code that may utilize or interpret markup languages, such as HTML (Hypertext Markup Language), XHTML (Extensible Hypertext Markup Language), or XML (Extensible Markup Language), and/or client-side scripting languages, such as JavaScript®, AJAX (Asynchronous JavaScript® and XML), DOM (Document Object Model) scripting, Flex (ActionScript), VBScript, or the like.

As one example, a client computing device may execute a browser, a mobile application or other online application to access online content in a network resource. The online content may include code, such as instructions, which may be processed by the browser to provide content or other network resources to the client computing device. Some examples of network resources include passive or active web pages, embedded web page resources such as images, video, audio, text, and executable code, and other resources for displaying or playing content on the client computing device, performing a function on the client computing device, and so forth.

In some instances, a portion of the instructions associated with a network resource may be interpreted or executed as one or more local processes on the client computing device to provide or perform a desired function. Further, at least a portion of the instructions associated with a network resource may be executed as one or more remote processes on one or more remote computing devices, such as may be provided by a cloud computing service or other network computing provider. For example, the client computing device may download a network resource that is rendered or otherwise processed by the client computing device. During processing of the network resource, the network resource may provide or may point to one or more instructions or scripts that employ or implement an application programming interface (API) or other remote processing request functionality that makes a remote processing request call over a network to a network computing provider. For example, the API or other remote processing request functionality may be implemented using a separate processing thread from a first processing thread that is executing a local process associated with the network resource. Accordingly, the processing of the network resource may continue uninterrupted and is not delayed by waiting for a response to the API call made to the network computing provider for execution of the remote process.

In response to receiving the remote processing request, the network computing provider may obtain executable instructions for executing the remote processing request. As one example, the first time that the network computing provider receives a remote processing request from a client computing device, the network computing provider may send a request for remote process information to the network resource provider. In response, the network resource provider may send remote process information to the network computing provider. The remote process information may include executable instructions for executing the remote process and, in some examples, may include data or a location of data for use in executing the remote process. As another example, the remote processing request received from the client computing device may identify a network location for the network computing provider to access to obtain and download the remote process information. Alternatively, in the case that the network computing provider has previously performed execution of the remote process, the network computing provider may store the executable instructions for executing the remote process and/or the data for use in executing the remote process at an accessible location such as at a storage location at the network computing provider. Still alternatively, in some examples, the network resource provider may provide the executable instructions and/or the data for use in executing the remote process to the network computing provider in advance in anticipation of one or more remote processing requests from one or more client computing devices.

In some examples, the remote process information may further include one or more libraries that contain standard or prewritten code segments that may be used or invoked by the remote process during execution by the network computing provider. As one concrete example, the remote process may be JavaScript® code executable by the network computing provider, and one or more JavaScript® libraries may be provided to the network computing provider that include a plurality of standard JavaScript® processes. Furthermore, in some implementations, one or more computing components at the network computing provider may be preconfigured, such as with one or more libraries or other data, instructions, or information depending on the nature of the remote process. Consequently, when the network computing provider receives a particular remote processing request, the particular remote processing request may be directed to one or more preconfigured computing components at the network computing provider preconfigured to execute the particular remote process.

The network computing provider may execute the remote process based on the remote process information. For example, the remote process may be a resource-intensive process that requires a substantial amount of computer processing capacity, memory, storage space, or the like. For example, a client computing device may have insufficient processing capability, memory capacity, or network connectivity to perform certain types of processing tasks, such as three-dimensional graphics rendering, interacting with relational databases, data mining, modeling of complex phenomena, and numerous other tasks that involve accessing or manipulating large quantities of data, or providing processor-intensive results. Furthermore, in some instances, the remote process may be used to maintain security of sensitive or confidential data. For example, by maintaining the data at a secure location that is not accessible by the client computing device, a remote process can be executed with respect to the sensitive data and the processing results provided to the client computing device without providing the client computing device access to the sensitive data.

In some examples, a user may cause a client computing device to load a browser application or other application for accessing one or more network resources provided by one or more network resource providers. Illustratively, the accessed network resource may include a collection of content such as a page of content having embedded content that may include images, video, audio, text, executable code, or so forth. For example, the application may have a content display area or pane for displaying the accessed network content in addition to one or more local interface components, such as toolbars, menus, buttons, or other user interface controls. In some examples, the application may render and display the network resource using a first processing thread and may make a call to the remote process using a second processing thread. Accordingly, the first processing thread may proceed without waiting for the second processing thread.

Additionally, in some implementations, the application may be modified to enable invoking the API or other process to make the remote processing request as a result of processing one or more markup language instructions in the network resource. Alternatively, one or more libraries of executable code may be provided to the application and executed to invoke the API or other process to initiate the remote processing request. In yet another example, a plug-in may be added to the application to provide the API or other functionality for invoking the remote processing request in response to one or more instructions contained in the network resource.

In some instances, the application may execute a process both locally and remotely, and utilize the results of the process that completes first. Alternatively, the application may determine dynamically, prior to execution of a process associated with a network resource, whether to execute the process as a local process or as a remote process based on the capabilities or available resources of the client computing device. As another alternative, the application may retrieve, or may be provided with, execution location information from a network location that indicates whether to execute the process locally or remotely. In some implementations, rather than identifying particular resources, such as suitable processor type, memory capacity, etc., the execution location information may be based on an identified type or class of the client computing device. Additionally, in some examples, the execution location information may be obtained from an execution location service that provides the execution location information based on aggregated data collected from a plurality of computing devices that have previously executed the process. Furthermore, implementations herein are not limited to the examples provided, but may be extended to other environments for remote processing, as will be apparent to those of skill in the art in view of the disclosure herein.

Example Framework

FIG. 1 illustrates an example framework 100 for remote process execution according to some implementations. The framework 100 includes a client computing device 102 in communication with a network resource provider 104 and a network computing provider 106. In the implementations herein the client computing device 102 may be any type of device capable of receiving and/or rendering a network resource such as digital media devices and eBook (electronic book) readers 102-1, tablet computing devices 102-2, desktop or server computing devices 102-3, smart phones and mobile devices 102-4, laptop and netbook computing devices 102-5, televisions, gaming systems and home electronic devices 102-6, and any other device capable of accessing and/or rendering a network resource.

The client computing device 102 may send a network resource request 108 to the network resource provider 104. For example, the network resource provider may be any sort of device that provides a network resource such as a webpage, website, web application, e-commerce site, online content, or the like. In response to receiving the network resource request 108, the network resource provider 104 may provide a requested network resource 110 to the client computing device 102. The client computing device 102 receives the requested network resource 110 and may execute one or more local processes in response such as rendering, executing, or otherwise processing the network resource 110.

The network resource 110 may have an associated remote process 112 that is intended to be executed remotely from the client computing device 102. For example, as mentioned above, certain types of processes may not be executed by the client computing device 102 for various reasons such as process requirements, memory requirements, data set size, data security requirements, or the like. Accordingly, some types of processes may be executed remotely at the network computing provider 106, which in some instances may be referred to as a cloud computing resource. Thus, the client computing device 102 during rendering or other execution of the network resource 110 may send a remote processing request 114 to the network computing provider 106.

In order to respond to the remote processing request 114 from the client computing device 102, the network computing provider 106 may obtain remote process information 116. For example, the remote process information 116 may include executable code such as executable instructions for performing the remote process 112. Furthermore, the remote process information 116 may include data to be used by the remote process 112 or may identify a storage location for data to be used in executing the remote process 112. For example, the data for the remote process 112 may be stored in a cloud storage location or other network location, which may or may not be affiliated with the network computing provider 106 or the network resource provider 104.

In some implementations, in response to receiving the remote processing request 114, the network computing provider 106 may access or send a request to the network resource provider 104 to obtain the remote process information 116. In other implementations, the network resource provider 104 may provide the remote process information 116 to the network computing provider 106 in advance of the remote processing request 114. For example, a developer of the network resource 110 may provide the remote process information 116 to the network computing provider 106 when making the network resource 110 available on a network. Furthermore, depending in part on the nature of the remote process 112, the network computing provider 106 may obtain the remote process information 116 from the network resource provider 104 the first time that the network computing provider 106 receives a remote processing request 114 for a particular remote process. The network computing provider 106 may then store the remote process information 116 locally and may respond to subsequent remote processing requests using a locally stored version of the remote process information 116.

When the network computing provider has obtained the remote process information 116, the network computing provider 106 may execute the remote process 112 and may return at least one processing result 118 to the client computing device 102. Depending on the nature of the remote process 112, the network computing provider may return a single processing result 118, or, alternatively, may return a large number or continuous stream of processing results 118. The client computing device 102 may receive the processing result 118 and may process the processing result 118 in accordance with executable instructions associated with the network resource 110. For example, the processing result 118 may be displayed in a portion of a rendered webpage or other web or online content, such as in a webview, a web application, a mobile application or the like. Numerous other variations will be apparent to those of skill in the art in light of the disclosure herein.

Example Architecture

Figure 2:
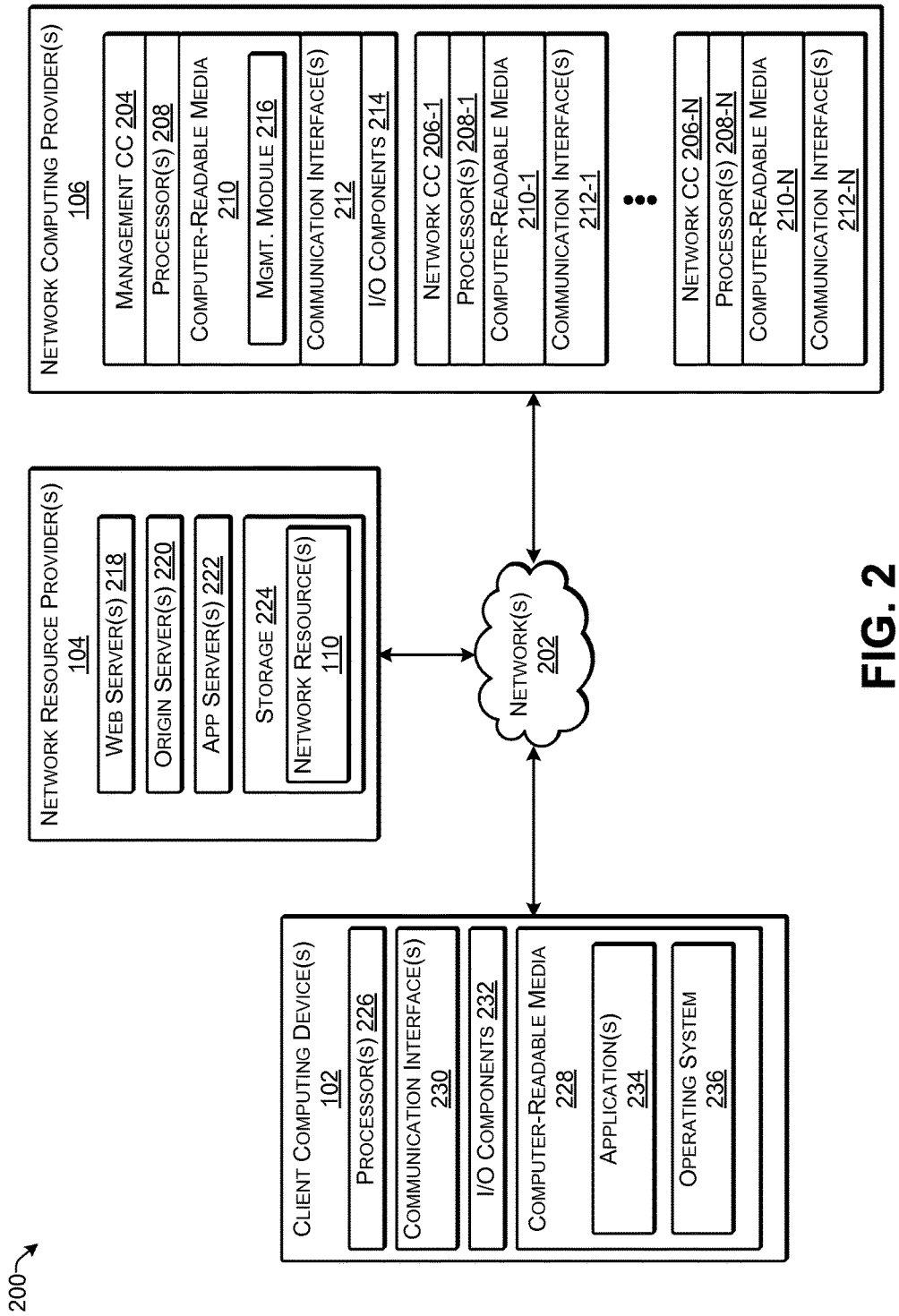
FIG. 2 illustrates an example architecture of a system for remote process execution according to some implementations.

FIG. 2 illustrates an example architecture of a system 200 including at least one network resource provider 104 for providing one or more network resources 110 to at least one client computing device 102 according to some implementations. The network resource provider 104 is able to communicate with the client computing device 102 and at least one network computing provider 106 through at least one network 202. For example, the network 202 may include any appropriate network, such as a local area network (LAN), a wide area network (WAN), e.g., the Internet, or any combination thereof, and may include both wired and wireless communication technologies using any suitable protocols and communication techniques. The network resource provider 104, the client computing device 102, and the network computing provider 106 may communicate and interact with one another using any combination of suitable communication and networking protocols, such as Internet protocol (IP), transmission control protocol (TCP), hypertext transfer protocol (HTTP), and so forth.

In some implementations, the network resource provider 104 and/or the network computing provider 106 may include one or more servers or other types of computing devices that may be embodied in any number of ways. For instance, in the case of a server, the network resource provider 104 and/or the network computing provider 106 may be implemented using a single server, a cluster of servers, a server farm or data center, a cloud-hosted computing service, and so forth, although other computer architectures (e.g., a mainframe architecture) may also be used. Further, while the figures illustrate the components of the network resource provider 104 and/or the network computing provider 106 as being present in a single respective location, it is to be appreciated that these components may be distributed across different computing devices and locations in any manner. Generally, network resource provider 104 and/or the network computing provider 106 may provide the various functionalities described herein distributed in various ways across different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 2, the network computing provider 106 includes a management computing component (CC) 204 and one or more network computing components (CC) 206-1, . . . , 206-N. The management computing component includes one or more processors 208, one or more computer-readable media 210, one or more communication interfaces 212, and one or more input/output (I/O) components 214. Similarly, the network computing component 206-1 includes processor(s) 208-1, computer-readable media 210-1, and communication interfaces 212-1, while the network computing component 206-N includes processor(s) 208-N, computer readable media 210-N, and communication interface(s) 212-N. The network computing components may or may not include various I/O components 214, depending on the configuration of the network computing provider 106.

The processor(s) 208, as well as the other processors described herein, may be a single processing unit or a number of processing units, and may include single or multiple computing units or multiple processing cores. The processor(s) 208 can be configured to fetch and execute computer-readable instructions stored in the computer-readable media 210, such as one or more software modules or components, including a management module 216 for performing the various functions attributed to the management computing component 204.

The computer-readable media 210, as well as the other computer-readable media described herein, may include volatile and nonvolatile memory and/or removable and non-removable media implemented in any type of technology for storage of information, such as computer-readable instructions, data structures, program modules, or other data. Such computer-readable media 210 includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device or other processor. Depending on the configuration of the network computing provider 106, the computer-readable media 210 may be a type of computer-readable storage media and may be a non-transitory storage media.

The communication interface(s) 212, as well as the other communication interfaces described herein, may include one or more interfaces and hardware components for enabling communication with various other devices, such as the client computing device 102 and/or the network resource provider 104, over the network(s) 202. For example, communication interface(s) 212 may facilitate communication through one or more of the Internet, cable networks, cellular networks, wireless networks (e.g., Wi-Fi, cellular, near-field) and wired networks. Various different approaches to examples described herein can be implemented in various environments. For instance, the network(s) 202 may include any appropriate network, including an intranet, the Internet, a cellular network, a LAN, WAN, VPN (Virtual Private Network) or any other network or combination thereof. Components used for such a system can depend at least in part upon the type of network and/or environment selected. Protocols and components for communicating via such networks are well known and will not be discussed herein in detail.

Management computing component 204 may further be equipped with various input/output (I/O) components 214. Such I/O components 214 may include a display, various user interface controls (e.g., buttons, mouse, keyboard, touch screen, etc.), audio speakers, connection ports and so forth. As mentioned above, in some instances, the network computing components 206 may also include one or more I/O components 214.

The computer-readable media 210 may be used to maintain any number of functional components that are executable by the processors 210. In many implementations, these functional components comprise instructions or programs that are executable by the processors 210 and, when executed, implement operational logic for performing the actions attributed to the network computing provider 106. An example functional component of the management computing component 204 that may be executed on the processor(s) 208 for implementing the various functions and features related to providing network computing services, as described herein, includes the management module 216, as well as various other modules, components, software and code, as described in the various implementations herein.

Additional functional components stored in the computer-readable media 210 that are not shown in FIG. 2 may include one or more operating systems for controlling and managing various functions of the network computing provider 106. In addition, the computer-readable media 210 may include, or the network computing provider 104 may access data (not shown in FIG. 2) used by the various components and modules, as described herein. The network computing provider 106 may also include many other logical, programmatic and physical components, of which those described above are merely select examples that are related to the discussion herein.

In some implementations, the network computing provider 106 can include a plurality of the network computing components 206-1, . . . , 206-N that can correspond to different nodes on the network(s) 202 and which may also correspond to different points of presence on the network(s) 202. In some examples, each network computing component 206 may be configured for performing processing via one or more instances of a virtual machine, generally referred to as an instance of a network computing component 206. Network computing components 206 may include physical computing device resources and software to provide the multiple instances of a virtual machine or to dynamically cause the creation of instances of a virtual machine. Such creation can be based on a specific request, such as from a client computing device 102, the management computing component 204, or the network computing component 206 can initiate dynamic creation of an instance of a virtual machine on its own. Each network computing component 206 may include designated storage included in computer-readable media 210 made up of a number of storage devices for storing any type of data used in the delivery and processing of network or computing resources, including but not limited to user data, state information, processing requirements, historical usage data, and resources from network resource providers 104 that is processed by an instance of a network computing component 206 and transmitted to various client computing devices 102, or the like. The management computing component 204 and/or the network computing components 206 may further include additional software and/or hardware components that include, load balancing or load sharing software/hardware components for selecting instances of a virtual machine supporting a requested application and/or providing information to facilitate request routing.

In some implementations, the network computing components 206 and their components may be logically grouped, regardless of whether the components, or portions of the components, are physically separate. For example, the network computing provider 106 may maintain separate points of presence for providing the network computing components 206. Thus, the network computing components are illustrated in FIG. 2 as logically associated with the network computing provider 106, but the network computing components 206 may be geographically distributed throughout the network(s) 202 in a manner to best serve various demographics of client computing devices 102. Additionally, the network computing provider 106 can be associated with various additional computing resources, such as additional computing devices for administration of content, resources, and the like.

In the illustrated example of FIG. 2, the network resource provider 104 may correspond to a logical association of one or more computing devices associated with a content or network resource provider. Specifically, the network resource provider 104 can include one or more web server(s)

218 corresponding to one or more server computing devices for obtaining and processing requests for content, such as web pages or other network resources, from the client computing devices 102. The network resource provider 104 may further include one or more origin server(s) 220 corresponding to one or more computing devices for obtaining and processing requests for network resources from a content delivery service provider (not shown in FIG. 2). The network resource provider 104 may further include one or more application server(s) 222, such as a data streaming server, for processing streaming content requests. Together or separately the servers 218, 220, 222 may be associated with storage 224 that may contain one or more network resources 110 available to be accessed by the client computing devices 102. The web server(s) 218, the origin server(s) 220 and the application servers(s) 222 may include one or more processors, computer readable media, communication interfaces, and I/O components (not shown in FIG. 2 for clarity), similar to those described above, but may include different functional components and data.

The network resource provider 104 can be associated with various additional computing resources, such as additional computing devices for administration of content and resources, DNS (domain name system) name servers, and the like. For example, although not illustrated in FIG. 2, the network resource provider 104 can be associated with one or more DNS name server components that would be authoritative to resolve client computing device DNS queries corresponding to a domain of the network resource provider 104.

In some examples, the network resource provider(s) 104 may be operated by one or more entities that are separate from one or more entities that operate the network computing provider(s) 106. For instance, the network computing provider 106 may be operated by a cloud-based computing provider, while the network resource providers 104 may be operated by various website owners. In other examples, however, the network computing provider 106 and the network resource provider 104 may be operated by the same or related entities.

The system 200 further includes the one or more client computing devices 102 that may communicate with the network resource provider(s) 104 and the network computing provider(s) 106. As mentioned above, the client computing devices 102 may correspond to a wide variety of computing devices. The client computing devices 102 may include hardware and software components for establishing communications over the network(s) 202. For example, the client computing devices 102 may be equipped with networking equipment and browser software applications or other applications that facilitate communications via the Internet or an intranet. The client computing devices 102 may have varied local computing resources such as central processing units or other processor architectures, memory or mass storage (collectively included in computer-readable media), graphics processing units, communication network availability and bandwidth, and so forth. In the illustrated example, the client computing device 102 may include one or more processors 226, computer readable media 228, communication interfaces 230 and I/O components 232.

The I/O components 232 that may be included with the client computing device 102 may include a display for displaying network resources to a user as well as various controls and input devices, such as a virtual or physical keyboard, a mouse, a pointing stick, a touchpad, a trackball, a joystick, a remote control, buttons, accelerometer, gyroscope, compass, Global Positioning System device and/or various other controls for performing desired inputs and interactions with the client computing device 102 and network resources 110 displayed on client computing device 102.

In some examples, the computer-readable media 228 may be similar to the computer-readable media 210 described above, but may include different functional components and data. For example, computer readable media 228 may include one or more applications 234 and an operating system 236. The application(s) 234 may include a browser application, as mentioned above, or other applications, such as a mobile application, online application, or the like, able to communicate with the network resource provider(s) 104 and/or download, render or execute network resources 210. The client computing device 102 may include various other hardware and software components not illustrated in FIG. 2, depending on the configuration, type and intended use of the client computing device 102. Additionally, the illustrated system is merely one example provided for discussion purposes, and numerous other variations will be apparent to those of skill in the art in light of the disclosure herein.

Figure 3:
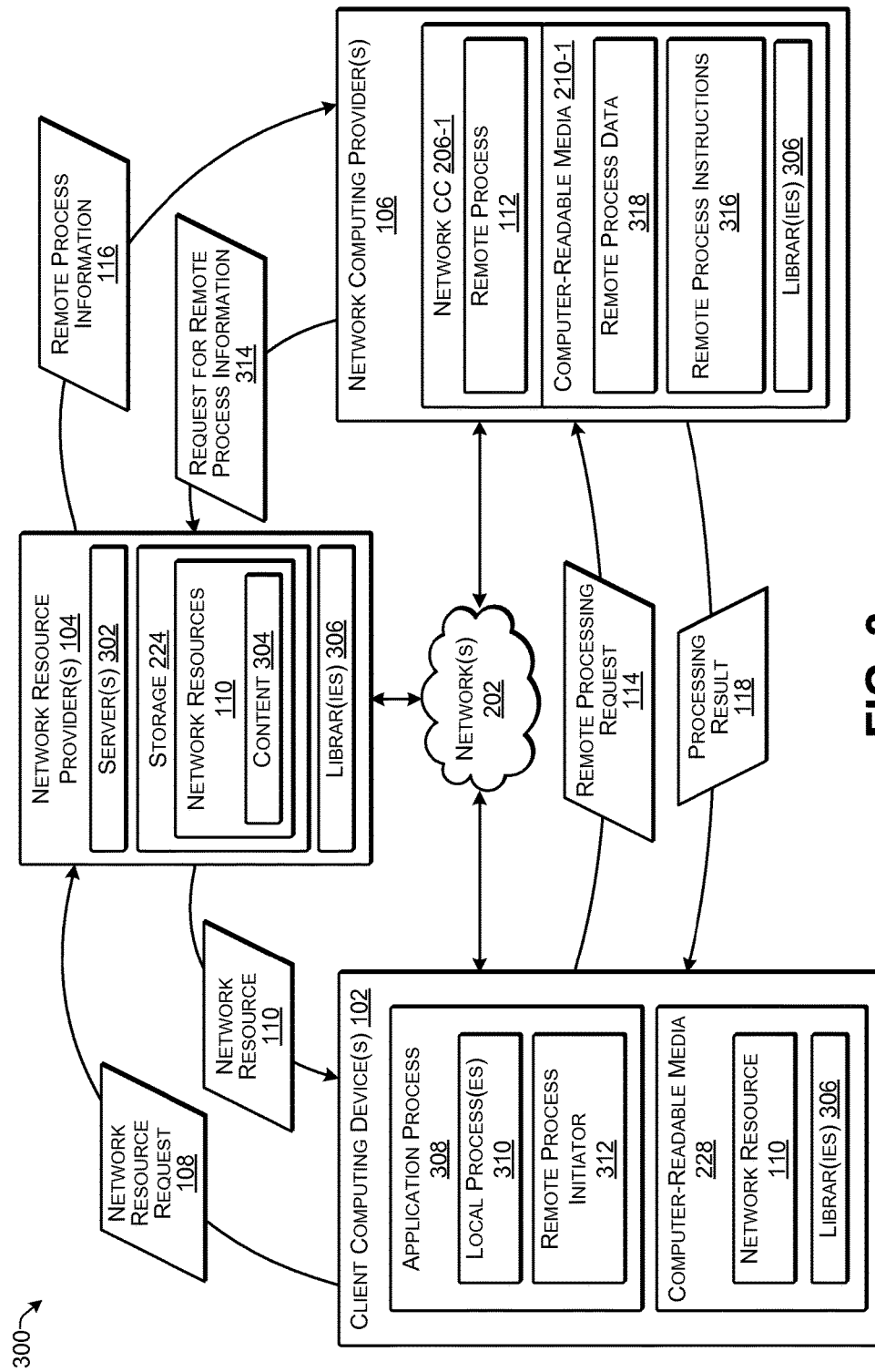
FIG. 3 illustrates an example of remote process execution according to some implementations.

FIG. 3 illustrates an example 300 of remote process execution in the system architecture of FIG. 2 according to some implementations. In the illustrated example, the client computing device 102 receives a network resource 110 from the network resource provider 104 in response to the network resource request 108. For example, the client computing device 102 may utilize the browser application 234 or other suitable application 234 on the client computing device to access network resource(s) 110 provided by the network resource provider 104. The client computing device may download the network resource 110 from one or more servers 302 of the network resource provider 104 (which may correspond to any one of the web server 218, origin server 220, or application server 222 discussed above). As mentioned above, the network resource 110 may include content 304, such as one or more webpages or other web content, online content, streaming content, or the like. Additionally, in conjunction with receiving the network resource 110 from the server 302, the client computing device 102 may also receive or may access one or more libraries 306 that may be used when rendering or executing the network resource 110. For example, in the case that the network resource 110 includes executable JavaScript® code, the libraries 306 may include one or more JavaScript® libraries. However, implementations herein are not limited to JavaScript® and may encompass other scripting languages or other forms of network resources 110. Furthermore, in other implementations, libraries 306 may not be used.

Upon receiving the network resource 110, the application 234 may initiate execution of an application process 308 to process and/or render the network resource 110 on the client computing device 102. For example, the application process 308 may include one or more local processes 310, and further according to implementations herein, may invoke a remote process initiator 312 to initiate one or more remote processes 112, which may be executed concurrently with the local process(es) 310. As discussed below, in some implementations, the remote process initiator 312 may be invoked by a local process 310 in connection with processing of the network resource 110. For example, the network resource 110 may include one or more instructions to cause the invocation of the remote process initiator 312 and thereby cause the initiation of the remote process 112 at the network computing provider 106.

As one example, the network resource 110 may include a script tag, embedded script, or other instructions to invoke an executable script as a local process 310, which in turn may invoke the remote process initiator 312. The remote process initiator may be executable code, module or functionality configured to initiate the remote process 112 at the network computing provider 106, such as through an API. Alternatively, the network resource 110 may include a script tag or the like that directly invokes the remote process initiator 312. For instance, in an example in which the network resource 110 is an HTML document, the HTML document may include a script tag that points to a source having an executable script to be executed by a browser or other application. The executable script may itself be the remote process initiator 312, or the executable script may be executed as a local process 310 that invokes the remote process initiator 312. In some cases, the executable script and/or the remote process initiator 312 may be included in the library 306 provided with or referenced by the network resource 110. In other cases, the executable script and/or remote process initiator 312 may be an integral part of the browser or other application 234, or included with a plug-in to the browser or other application 234.

The remote process initiator 312 may send a remote processing request 114 to the network computing provider 106. The management computing component 204 may receive the remote processing request 114 and designate a suitable network computing component 206 for execution of the remote process. For example, in some implementations, the management computing component 204 may perform load-balancing to select one or more available network computing components 206 for execution of the remote process 112, such as network computing component 206-1 in this example. Additionally, in some examples, the management computing component 204 may select one or more network computing components 206 that have been preconfigured to execute the particular remote process 112. For example, one or more specific network computing components 206 may be preconfigured by the network computing provider 106 and/or the network resource provider 104 with one or more libraries, or other suitable software or data for executing a particular remote process 112.

The selected network computing component 206-1 may obtain remote process information 116 for executing the remote process 112. For example, when the remote processing request is a first request for execution of the remote process 112, the network computing component 206-1 may communicate a request 314 for remote process information with the network resource provider. Alternatively, the network computing component may access a network location specified in the remote processing request 114 to obtain the remote process information 116 to be used for executing the remote process 112. For instance, in some implementations, the remote processing request 114 may include one or more parameters that provide the network computing component 206-1 with location information, such as a network location for obtaining the remote process information 116. In other examples, the management computing component 204 may provide the network computing component 206-1 with the network location. In still other examples, the one or more network computing components may be preloaded with the remote process information 116. Furthermore, after the remote process 112 has been executed a first time, the network computing component 206-1 may store the remote process information for local access and consequently, in some examples, may not need to obtain the remote process information from the network resource provider the next time a remote processing request is received for the particular remote process 112.

The remote process information 116 may include remote process instructions 316 to be executed by the network computing component 206-1. Furthermore, in some implementations, the remote process information 116 may include remote process data 318 to be used during execution of the remote process 112. Alternatively, rather than including the data with the remote process information 116, the remote process information 116 may point to a network location from which the data may be obtained by the network computing component 206-1. Additionally, in some examples, the remote process information 116 may include one or more libraries 306 as discussed above, which may include one or more prepared code segments that may be used by the network computing component 206-1 during execution of the remote process 112.

The network computing component 206-1 may execute the remote process 112 in accordance with the remote process information 116 and may provide one or more processing results 118 to the remote process initiator 312, directly to a local process 310, or directly to the application process 308 on the client computing device 102. The remote process initiator 312 may provide the processing results 118 from the remote process 112 to the local process 310 that invoked the remote process initiator 312 or may otherwise make the processing results 118 available to the application process 308.

Figure 4:
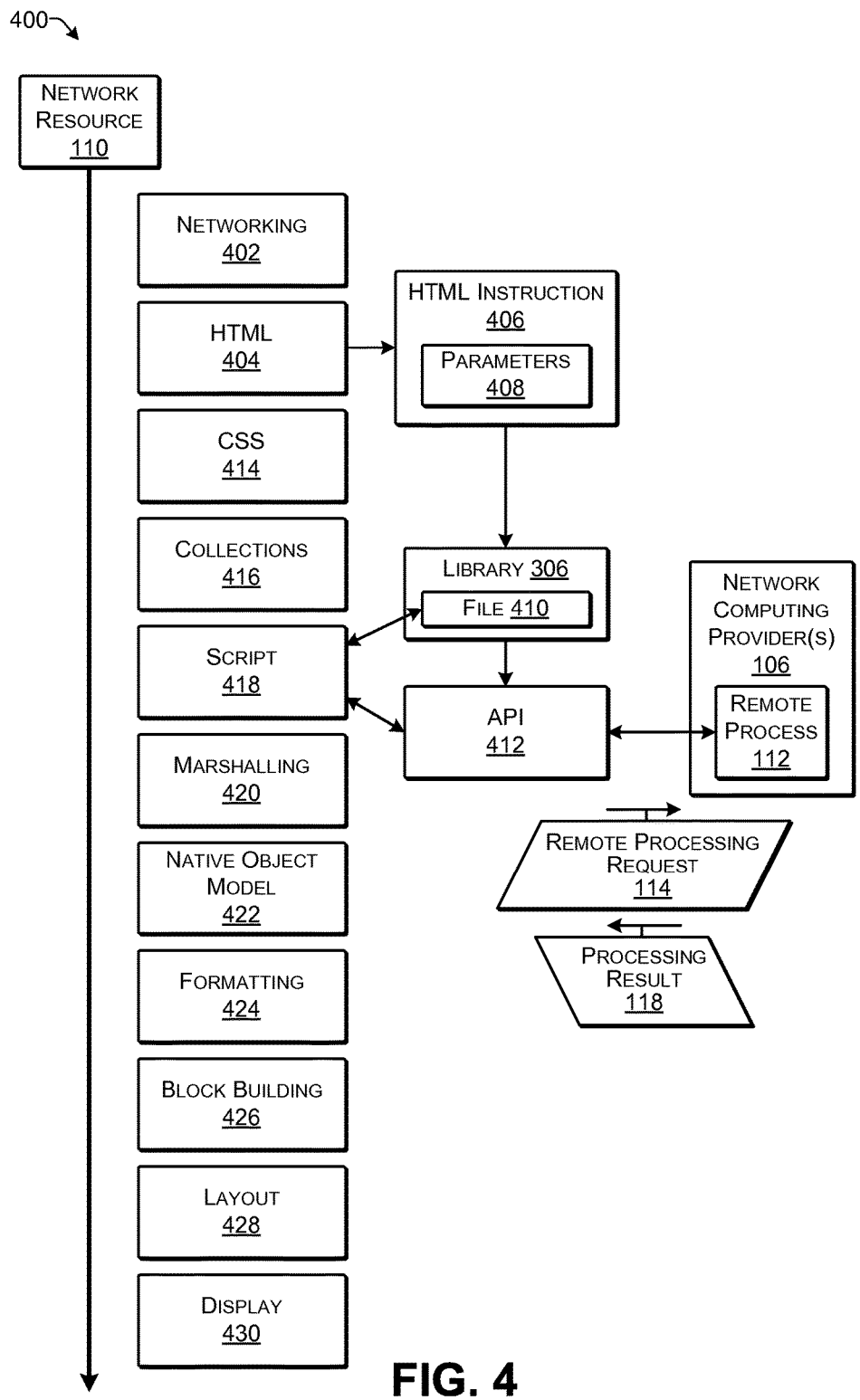
FIG. 4 illustrates an example of browser application processing of a network resource according to some implementations.

FIG. 4 is a block diagram illustrating example browser processing actions as a series of processing block subsystems 400. In some examples, a browser application 234 may process sets of content (e.g., network resources 110, such as web pages and associated embedded resources) in a series of processing actions. Further, in some implementations herein, there may be one or more separate remote processing actions performed at a network computing provider 106 in addition to the processing actions performed at the client computing device 102. Thus, one or more remote processes 112 may be performed by one or more of the network computing components 206, while the client computing device 102 contemporaneously performs other processing actions with respect to a network resource 110. For example, a network computing component 206 may execute one or more remote processes 112, and send a processing result(s) 114 to the client computing device 102 for integration during assembly and display of the network resource 110.

Various network resources (e.g., webpages, video, Flash® documents) may require various processing actions before being displayed on a client computing device 102. A webpage, for example, may be parsed to process various HTML layout information and references to associated resources or embedded content, such as CSS style sheets and JavaScript®, as well as embedded content objects such as images, video, audio, etc. The HTML and each referenced object or piece of code may typically be parsed and processed before a representative object model corresponding to the webpage is constructed. This object model may then be processed further for layout and display in a content display area of a browser application at the client computing device 102. Illustrative browser application processing actions are described in greater detail below, however, one of skill in the art will appreciate that, in the case of other implementation or applications, various other processing actions may be employed.

The block subsystems 400 illustrated in FIG. 4 are provided for discussion purposes, and are not intended to depict a necessary order or a definitive list of browser subsystems. Various browser application software components may implement additional or fewer browser subsystems than are shown here, and may order the subsystems or corresponding processing actions in any number of different ways. Further, although the processing block subsystems 400 depicted here for purposes of illustration are directed to the processing of webpages or other web content, the processing of other file types or network resources may be broken up in a similar manner. For example, a similar schema may be developed for the processing of images, video, audio, database information, 3D design data, or any other file format or type of data. Similar schema may also be developed for any number of device operating system or software framework processing operations, such as scheduling, memory or file management, system resource management, process or service execution or management, etc.

A first processing subsystem that may be involved in the processing and display of the network resource 110 is a networking subsystem 402. The networking subsystem 402 may be responsible for all communication between the browser application 234 and a network resource provider 104, including local caching of web content in the computer-readable media 228, such as in a memory. The networking subsystem 402 may be limited by the performance of the user's network. Communications between the network resource provider 104 and the network computing provider 106 may also be handled by a similar networking subsystem for obtaining remote process information from the network resource provider 104.

As network resources 110, such as HTML documents, are downloaded from a server of the network resource provider 104, the network resources 110 may be passed to an HTML subsystem 404, which parses the HTML documents, initiates additional downloads in the networking subsystem 402, such as due to HTML tags, and creates a structural representation of the document. The browser application 234 may also contain related subsystems that are used for XHTML, XML and SVG documents.

According to some implementations herein, an HTML instruction 406, such as a script tag, or the like, may be used to invoke or initiate the remote process 112 described above. For example, a web developer may choose to use the remote process 112 to execute processor-intensive or data-intensive processes remotely and concurrently with the processing of a network resource. Accordingly, the web developer may control the amount of resources used by a client computing device 102 by including an HTML instruction 406 that identifies or points to a process to be executed as a remote process 112, rather than as a local process. For instance, the HTML5 standard (e.g., W3C Working Draft May 2011) includes a provision for local process execution entitled "web workers," which provides syntax for running local scripts as local background processes. Accordingly, a similar syntax format may be employed in some examples herein to use an HTML instruction 406, such as a script tag in an HTML document to invoke a script that may include or may invoke an application programming interface (API) or other functionality to initiate a remote process 112 at a network computing provider 106. For instance, a script tag or other markup language instruction or element may include or may identify a script file (or a script file source) to be executed to ultimately cause execution of the remote process 112. Further, in some instances, the HTML instruction 406 may include parameters 408 that are used by the API and/or the remote process.

As one example, the library 306 provided with or referenced by the network resource 110 may be a JavaScript® library or other scripts library, and the HTML instruction 406 may call a local script file, such as a JavaScript® file or other executable file 410 included in the library 306. The file 410 may implement an API 412 or other functionality as a separate processing thread from the main processing thread performing the processing of the network resource 110. The API 412 may take information provided by the HTML instruction 406, such as parameters 408, and/or information provided by the file 410 to send a remote processing request 114 to a network computing provider 106 identified by at least one of the HTML instruction 406 or the file 410. The remote processing request 114 may include information such as a URL (uniform resource locator), a remote process identifier, or other information, to enable the network computing provider to identify the remote process 112 and/or a network resource provider 104 or a location on the network 202 from which to obtain the remote process information 116. The network computing provider 106 may use the remote process information 116 and any parameters 408 passed from the client computing device 102 in the remote processing request 114 to execute the remote process 112 and return one or more processing results 118 to the client computing device 102. In some instances, the remote processing results 118 are utilized at the script subsystem, as discussed below.

As another example, rather than relying on library 306, such as a JavaScript® library, the browser application 234 itself may be modified to respond to the remote process command 406. For example, the browser application 234 may include a module (not shown in FIG. 4) that initializes the API 412 or other functionality to provide the remote processing request 114 to the network computing provider 106. As still another example, a browser plug-in (not shown in FIG. 4) may be applied to the browser application 234 and may be configured to respond to the remote process command 406. Furthermore, in other implementations, a different technique may be used to initialize the remote process 112.

When CSS information is encountered in the network resource 110, such as inside an HTML document or as an embedded CSS document, the CSS information may be passed to a CSS subsystem 414 to parse the style information and create a structural representation that can be referenced later.

In addition, HTML documents often contain metadata, such as the information described in a document header or the attributes applied to an element. The collections subsystem 416 may be responsible for storing and accessing this metadata.

When a script, such as JavaScript®, is encountered, the script may be passed directly to a script subsystem 418 responsible for executing the script. The script subsystem 418 may construct a processing result including an internal representation of one or more scripts, including, but not limited to state data or a representation of the script in a native or intermediate form, as well as any other processed structures or data, and provide the processing result and associated embedded resources to the client computing device 102 for processing.

Because many script engines, such as JavaScript® engines, are not directly integrated into the browser application 234, there may be a communication layer including a marshalling subsystem 420 between the browser application and the script engine. Passing information through this communication layer may generally be referred to as "marshalling." When a remote process 112 is called, actions at the marshalling subsystem 420 may construct a processing result including marshalling data as well as any other processed structures, scripts, or data discussed above, and provide the processing result and associated embedded resources to the client computing device 102 for processing.

In some examples, a script, such as JavaScript®, interacts with an underlying network resource such as a web document through the Document Object Model (DOM) APIs. These APIs may be provided through a native object model subsystem 422 that is configured to access and manipulate the document and is the primary interaction point between the script engine and the browser application 234.

When the document has been constructed, the browser application may apply style information before the constructed document can be displayed to the user. The formatting subsystem 424 takes the HTML document and applies styles.

In some examples, CSS is a block-based layout system. After the document is styled and formatted, the next action, at a block building subsystem 426, may be to construct rectangular blocks that will be displayed to the user. This process may determine things like the size of the blocks and may be tightly integrated with the next action related to layout.

Subsequent to the browser application performing styling of the content and constructing the blocks, the browser application may go through the process of laying out the content. The layout subsystem 428 may perform this algorithmically complex process.

The final action of the process may occur inside the display subsystem 430 where the final content is displayed to the user. This process is often referred to as drawing or rendering. In addition, while HTML is used in the example above, HTML is just one example of a suitable markup language according to some implementations herein. Thus, implementations herein are not limited to HTML and, further, implementations herein are not limited to markup language documents as the network resources 110, but can include other types of network resources that may invoke or utilize a remote process 112.

Figure 5:
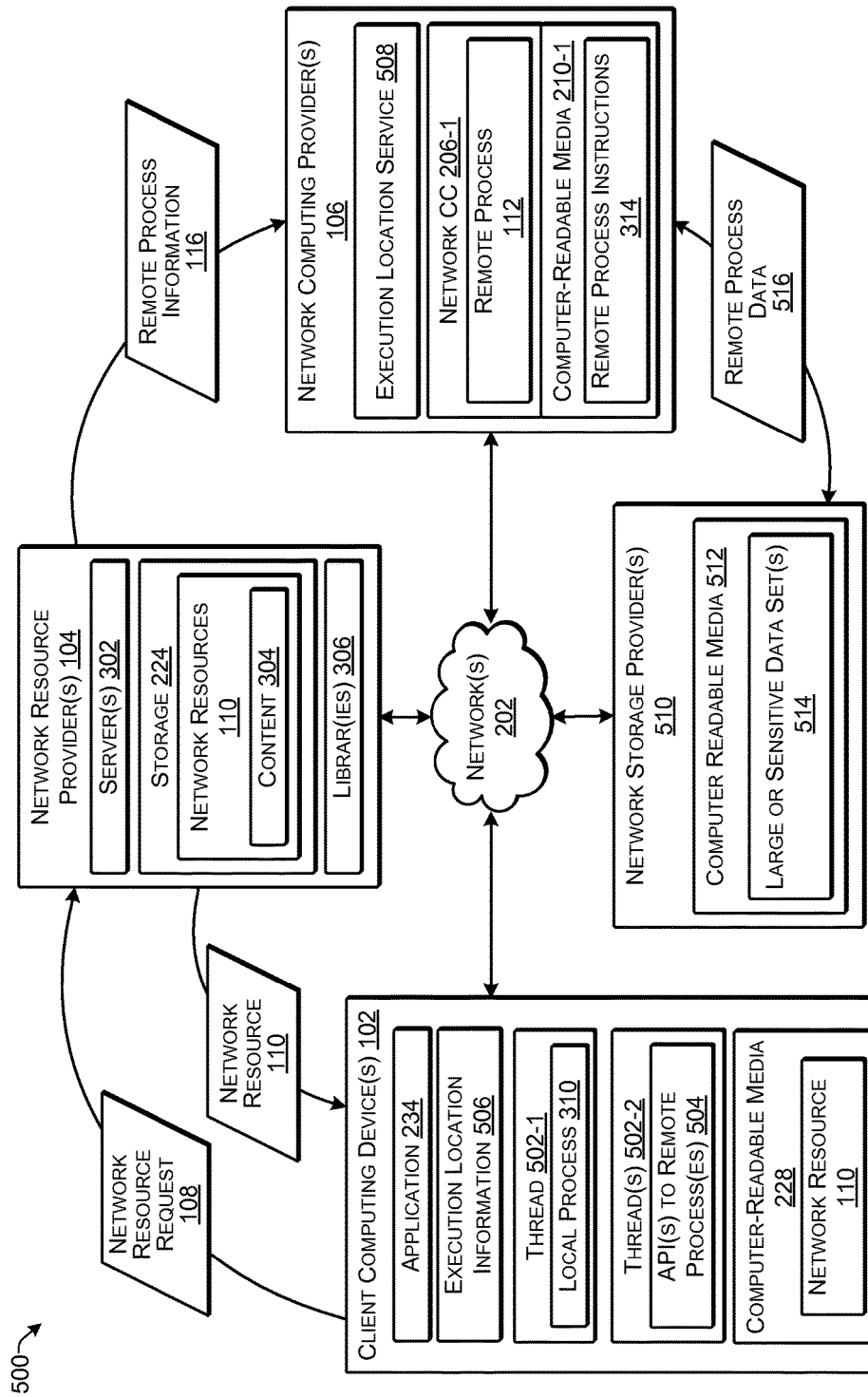
FIG. 5 illustrates an example of remote process execution according to some implementations.

FIG. 5 illustrates an example 500 of remote process execution in the system architecture of FIG. 2 according to some implementations. In the illustrated example, the application 234 executes a local process 310 in a first processing thread 502-1. One or more APIs 504 to call the remote process 112 may be implemented in one or more second processing threads 502-2. Consequently, the local process 310 may execute unimpeded by the API call to the remote process 112. For example, in the case that the local process 310 is a JavaScript® process, typically capable of only single thread execution, the local process 310 may be executed without having to wait for a processing result of the remote process 112, which may also be a JavaScript® process.

As discussed above, the application 234 may receive and process the network resource 110. During processing of the network resource 110, the application 234 may encounter a script tag or other instruction to execute a process related to the network resource 110. In this example, the process may be executed as a local process 310 and/or as a remote process 112. As one example, the application 234 may execute the process as both a local process 310 and a remote process 112, such as by using a local web worker script to initialize a local process 310 and by using a script, such as file 410, to invoke a remote process 112, as discussed above with reference to FIG. 4. The application 234 may then utilize the results of whichever process 112, 310 completes processing first.

Alternatively, the application 234 may determine dynamically, prior to execution, whether to execute the process as a local process 310 or as a remote process 112 based on the capabilities or available resources of the client computing device 102. For example, the application 234 may examine at least one of processing capability, memory size, mass storage capacity, network connectivity, or other relevant computing resources of the client computing device 102 when making the determination. Further, the network resource 110 or the process itself may specify minimum system requirements for executing the process locally as execution location information 506. Based at least in part on this execution location information 506 and the resources of the client computing device, the application 234 may determine whether to execute the process as a local process 310 or as a remote process 112.

As another alternative, the application 234 may retrieve or may be provided with execution location information 506 from a network location as to whether to execute a process locally or remotely. For example, execution location information 506 may be provided by the network resource provider 104 with the download of the network resource 110. Alternatively, execution location information 506 may be retrieved from the network resource provider 104 by the client computing device 102 in connection with processing the network resource 110.

In some implementations, rather than identifying particular resources such as suitable processor type, memory size, etc., the execution location information 506 may be based on an identified type or class of the client computing device 102. Thus, there may be a plurality of different types or classes of client computing devices 102 having different computing resources and capabilities, as discussed above with reference to devices 102-1 through 102-6 of FIG. 1. For some of these types or classes of client computing devices 102, it may be more efficient to run a particular process associated with a network resource 110 locally as a local process 310, while for other types or classes of client computing devices 102, it may be more efficient to run the process as a remote process 112. Accordingly, based on execution location information 506 that may identify particular types or classes of client computing devices 102 able to run the process locally, the application 234 may select one of a local process 310 or a remote process 112.

In some examples, the execution location information 506 may be obtained from an execution location service 508. For example, the execution location service 508 may be provided by a network computing provider 106, a network resource provider 104, or other network source, such as a browser developer, or the like. The execution location service 508 may aggregate data received from a plurality of client computing devices 102 related to execution of a particular process and other processes on the client computing devices 102. For example, a plurality of different ones of the client computing devices 102 may execute a particular process as both a local process 310 and as a remote process 112 and provide data to the execution location service 508 regarding which of the processes 310, 112 completed first. Furthermore, the execution location service 508 may keep track of the various different types of client computing devices 102 that provide the data to identify which types of client computing devices 102 should execute which processes locally or and which should execute certain processes remotely. Accordingly, the execution location service 508 may maintain execution location information 506 related to a plurality of different types of client computing devices 102 for a plurality of processes associated with a plurality of different network resources provided by a plurality of network resource providers 104.

Furthermore, in the example of FIG. 5, a network storage provider 510 may provide network storage for use by the remote process 112. In some examples, the network storage provider 510 may be separate from the network computing provider 106, such as geographically separate and/or separately owned, managed, or operated. In other examples, the network storage provider 510 may be associated with the network computing provider 106 and/or may be the same entity as the network computing provider 106, and may maintain storage capacity at the same one or more geographic locations as the network computing components 206 of the network computing provider 106.

The network storage provider 510 may provide network or cloud-based storage on computer readable media 512 to one or more customers or users, such as government entities, business entities, and so forth. For example, the network storage provider 510 may provide storage for numerous different types of data, which may include large or sensitive data sets 514. Examples of such types of data may include databases of medical records or images, financial record databases, customer/client databases, and the like. In some examples, it is undesirable to have the large or sensitive data sets 514 accessible by client computing devices 102, such as for security reasons, privacy concerns, and the like.

For instance, in the case of sensitive data to which access is desired to be controlled for security, privacy, confidentiality, or other reasons, network storage providers 510 may provide access control in a number of ways, such as by providing signed and/or time-expiring URLs. These URLs can also have restricted access based one or more specific IP address sets that are permitted to access a particular large or sensitive data set 514. Accordingly, in some implementations herein, the IP addresses of the network computing provider(s) 106 may be included in the set of IP addresses permitted to access a particular set of large or sensitive data 514, while the IP addresses of the client computing devices 102 are not included in the set of IP addresses permitted to access the particular data 514. Additionally, when the URLs for particular large or sensitive data sets 514 require signing for access, the signing key may be maintained at the network computing provider 106, rather than being provided to individual client devices 102, which is a more secure solution for maintaining the security of the large or sensitive data sets 514.

Further in other examples, the large or sensitive data sets 514 may be of such a large quantity of data that it would be impractical for the client computing device 102 to utilize the data on the client computing device 102 due to either the length of time and/or amount of bandwidth that would be used to transfer the data 514 to the client computing device 102, or due to limited storage capacity on the client computing device 102 and/or limited processing capability for processing large amounts of data. Consequently, through use of a remote process 112, these concerns may be avoided.

In this example, when the network computing component 206-1 obtains the remote process information 116, the remote process information 116 may point to a location at the network storage provider 510 at which a large or sensitive data set 514 that includes the remote process data 516 may be accessed for use by the remote process 112. The remote process 112 may access the remote process data 516 at the network storage provider 510 and, thus, provide processing results to the client computing device 102 without the client computing device 102 having access to the large or sensitive data set 514.

Example Processes

FIGS. 6-9 illustrate example processes for implementing the techniques described above for remote process execution. These processes are illustrated as a collection of blocks in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures, frameworks and environments described in the examples herein, although the processes may be implemented in a wide variety of other architectures, frameworks or environments.

Figure 6:
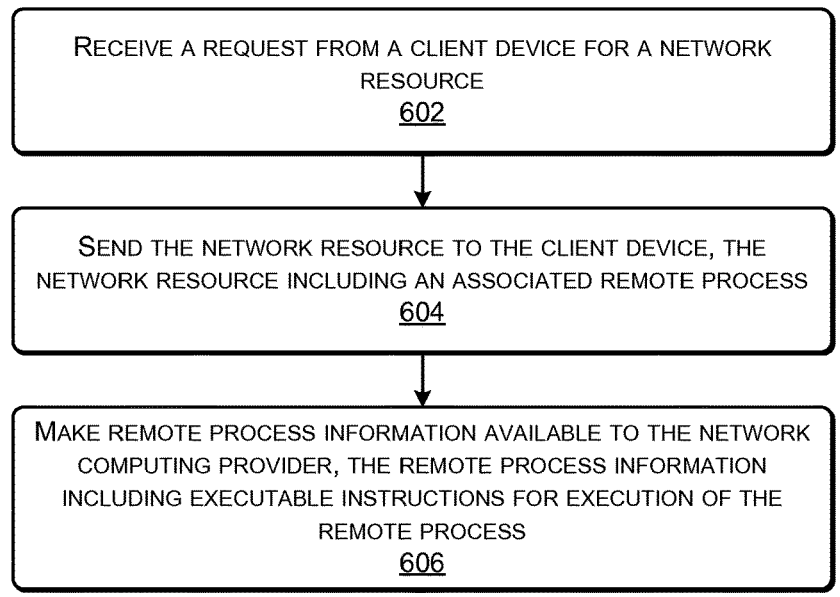
FIG. 6 is a flow diagram illustrating an example process for remote process execution that may be executed by a network resource provider according to some implementations.

FIG. 6 is a flow diagram illustrating an example process 600 that may be executed by the network resource provider 104 for remote process execution according to some implementations.

At 602, the network resource provider receives a request from a client computing device for a network resource. For example, the network resource provider may provide one or more network resources to be accessed or downloaded by one or more client computing devices.

At 604, the network resource provider provides the requested network resource to the client computing device. The network resource may include an associated remote process executable by a network computing provider, or the like, located over a network from the client computing device.

At 606, the network resource provider makes remote process information available to the network computing provider. For example, the network resource provider may store remote process information related to the remote process at a storage location and may make this remote process information available to the network computing provider, such as when the network computing provider receives a request from the client computing device to execute the remote process. The remote process information may include executable instructions to be used by the network computing provider for execution of the remote process. In some examples, the remote process information may also include data to be used during execution of the remote process. Additionally, in some examples, the executable instructions and/or the data may be prestored at a network location, and the network location may be provided to the network computing device in advance of receiving a remote processing request from the client computing device.

Figure 7:
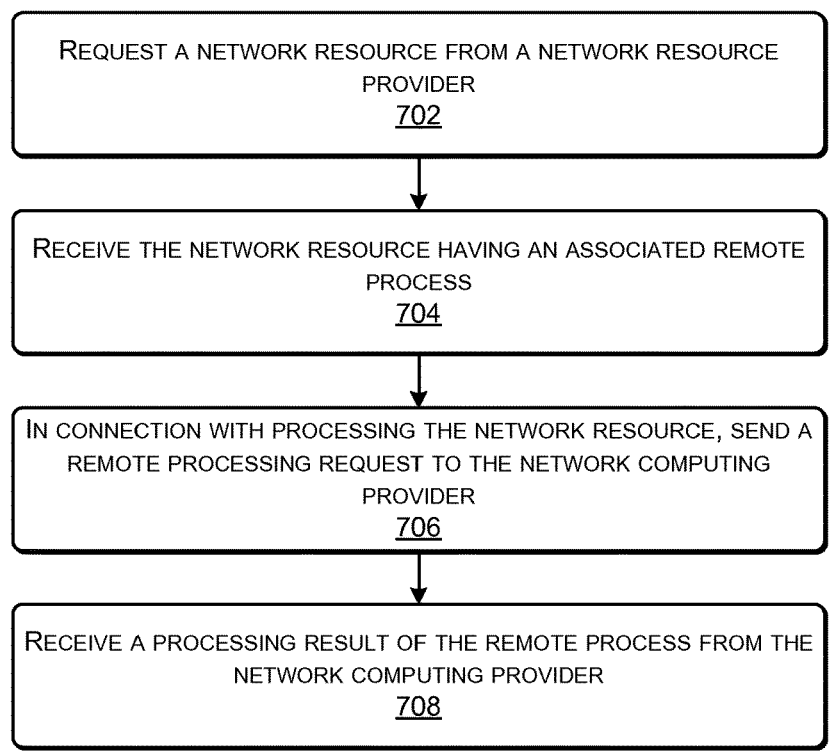
FIG. 7 is a flow diagram illustrating an example process for remote process execution that may be executed by a client computing device according to some implementations.

FIG. 7 is a flow diagram illustrating an example process 700 that may be executed by the client computing device for remote process execution according to some implementations.

At 702, the client computing device requests a network resource from a network resource provider. For example, the client computing device may request a webpage or other web content, a web application, an online application, or other content available on a network.

At 704, the client computing device may receive the network resource in response to the request. The network resource may have associated remote process to be executed remotely from the client computing device.

At 706, in connection with processing the network resource, the client computing device sends a remote processing request to a network computing provider to request execution of the remote process associated with the network resource. For example, in some implementations, markup language code processed by the client computing device may include one or more instructions to invoke the remote process. As one example, the one or more instructions may initialize an API that is used to make a call to an identified network computing provider to invoke the remote process at the network computing provider.

At 708, the client computing device receives a processing result of the remote process from the network computing provider. For example, the client computing device may receive one or more processing results from the network computing provider as callbacks through the API initialized on the client computing device.

Figure 8:
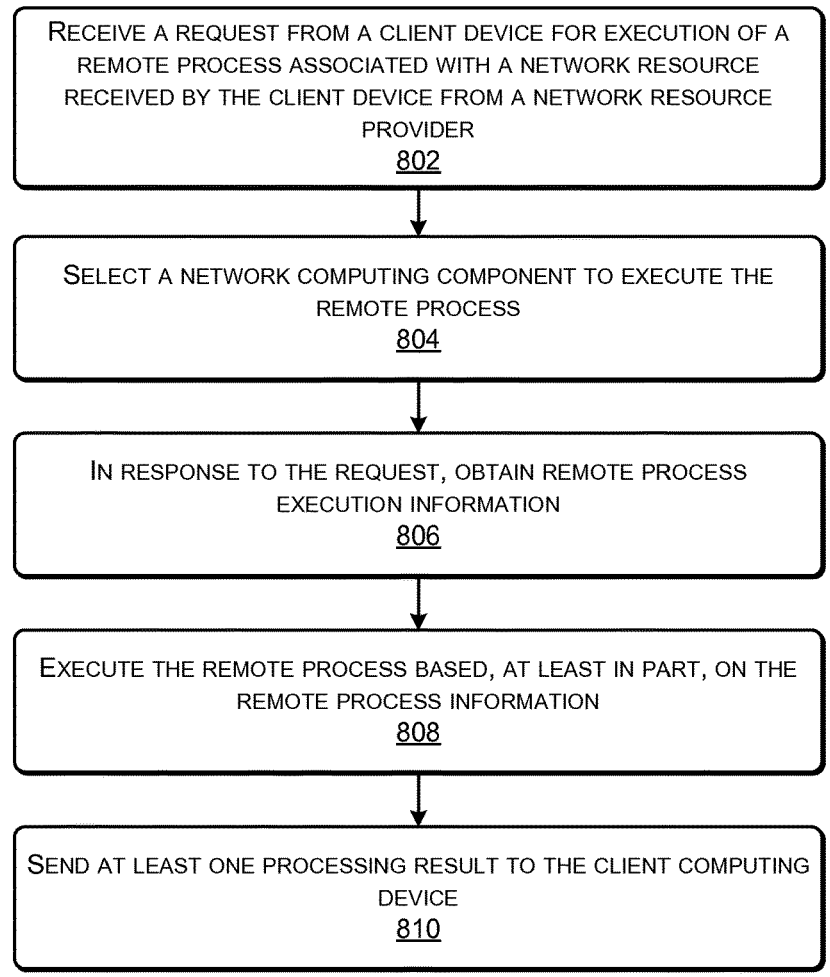
FIG. 8 is a flow diagram illustrating an example process for remote process execution that may be executed by a network computing provider according to some implementations.

FIG. 8 is a flow diagram illustrating an example process 800 that may be executed by the network computing provider for remote process execution according to some implementations.

At 802, the network computing provider receives a request from a client computing device for execution of a remote process associated with a network resource received by the client computing device from a network resource provider. For example, the network computing provider may receive requests for execution of one or more remote processes from one or more client computing devices At 804, the network computing provider selects a network computing component to perform execution of the remote process. For example, a management component may perform load-balancing to determine an appropriate network computing component to select to execute the remote process. Furthermore, in some examples, one or more specific network computing components may be preconfigured to execute one or more particular remote processes.

At 806, in response to the request from the client computing device, the network computing provider obtains remote process execution information. As one example, the selected network computing component may obtain the remote process information from a network location such as from the network resource provider or other location specified by the remote processing request. As another example, the network resource provider may provide the process execution information to the network computing component in advance of the request from the client computing device. Furthermore, after the network computing component has executed the remote process first time, the network computing component may store the remote process information for local access.

At 808, the network computing component executes the remote process based at least in part on the remote process information. For example, the remote process information may include at least one of executable instructions or data to be used during execution of the remote process.

At 810, the network computing component sends at least one processing result to the client computing device. For example, in some implementations, the processing result may be provided to the client computing device as an API callback.

Figure 9:
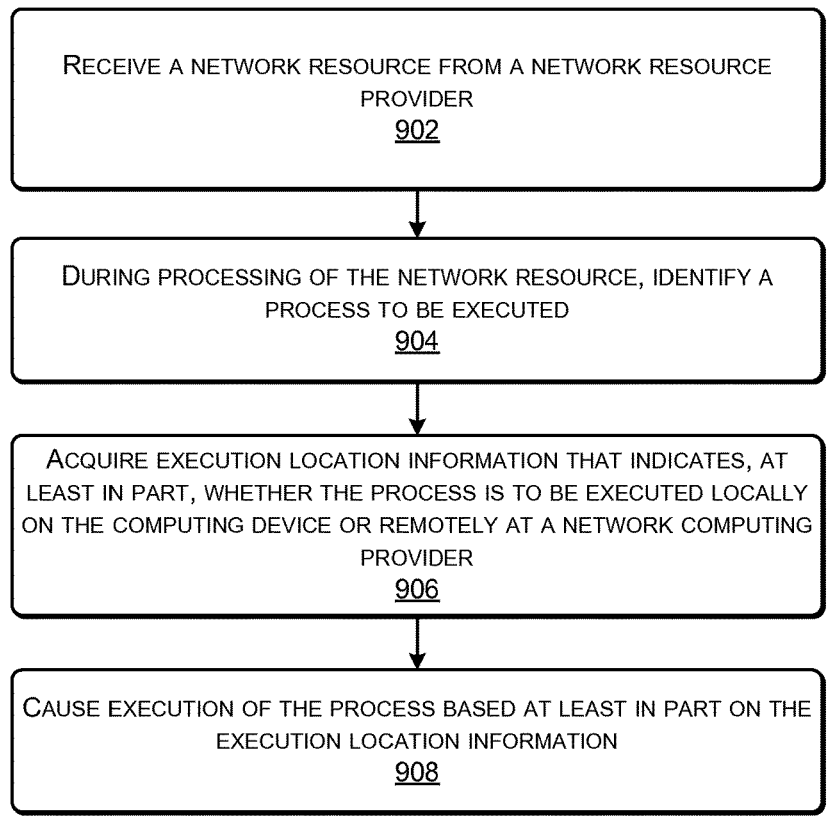
FIG. 9 is a flow diagram illustrating an example process executed by a client computing device to determine whether to execute a process locally or remotely according to some implementations.

FIG. 9 is a flow diagram illustrating an example process 900 that may be executed by the client computing device for determining whether to execute a process locally or remotely according to some implementations.

At 902, the client computing device receives a network resource from a network resource provider. For example, an application on the client computing device may download the network resource from a network resource provider.

At 904, during processing of the network resource, the client computing device identifies a process to be executed. For example, during rendering or other processing of the network resource, the client computing device may encounter a process to be executed in connection with the network resource.

At 906, the client computing device acquires execution location information that indicates at least in part whether the process is to be executed locally on the client computing device or remotely at a network computing provider. For example, the execution location information may be determined by the client computing device based on computing resources of the client computing device. As another example, the execution location information may be obtained from the network resource provider. Still alternatively, the execution location information may be obtained from a service that provides the execution location information based upon aggregated data collected from a plurality of computing devices that have previously executed the process.

At 908, the client computing device causes execution of the process based at least in part on the execution location information. For example, the client computing device may determine to execute the process locally or remotely based on the execution location information and additional information such as available resources of the client computing device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by a processor to perform operations comprising:
receiving a request from a client computing device for a webpage to be provided to the client computing device;
sending data representing the webpage to the client computing device in response to the request, wherein the data includes markup language such that the client computing device, in response to parsing the markup language and without further input from a user, initiates a local process to be executed by the client device and a remote process to be executed by a network computing provider;
receiving a request for remote processing information from the network computing provider;
generating the remote processing information, the remote processing information including executable instructions for execution by the network computing provider;
sending the remote processing information to the network computing provider, wherein the executable instructions in the remote processing information are for use by the remote process on the network computing provider to generate a processing result for the client computing device; and
receiving, from the client computing device, an indication which of the remote process execution or the local process execution completed first.

2. The one or more non-transitory computer-readable media as recited in claim 1, wherein the data further includes a script executable by the client computing device during processing of the webpage on the client computing device for communicating with the network computing provider.

3. The one or more non-transitory computer-readable media as recited in claim 1, wherein the remote process information at least one of includes or references a library of one or more executable code segments useable by the network computing provider during execution of the remote process.

4. The one or more non-transitory computer-readable media as recited in claim 1, wherein the data provides content to be rendered on the client computing device.

5. The one or more non-transitory computer-readable media as recited in claim 1, wherein the operations further comprise:
receiving the data from a plurality of additional computing devices, the data including data for execution, by the plurality of additional computing devices, of one or more processes used to process the webpage;
receiving first data from a first portion of the plurality of additional computing devices, the first data indicating that the first portion of the plurality of additional computing devices completed remote execution of a process of the one or more processes before completing local execution of the process, the first portion of the plurality of additional computing devices having first computing resources and first capabilities;
receiving second data from a second portion of the plurality of additional computing devices, the second data indicating that the second portion of the plurality of additional computing devices completed local execution of the process before completing remote execution of the process, the second portion of the plurality of additional computing devices having second computing resources different from the first computing resources and second capabilities different from the first capabilities;
producing execution location information based, at least in part, on the first data and the second data, the execution location information indicating that for each respective process of the one or more processes, the respective process is to be processed at least one of remotely by the network computing provider or locally by the client computing device; and
sending the execution location information to at least one of the client computing device, or the network computing provider.

6. A method comprising:
under control of one or more processors of a client computing device,
receiving data representing a webpage from a network resource provider, the data including instructions executable to initiate a remote process on a network computing provider and executable to initiate a local process;
sending, without further input from a user, a remote processing request to the network computing provider to cause the network computing provider to execute the remote process;
executing, by at least one of the one or more processors, the local process during processing of the remote process on the network computing provider;
receiving results from the network computing provider based on executing the remote process;
providing a rendering of the webpage based on results from at least one of the local process or the results from the network computing provider;
generating an indication of which of the remote process or the local process completed first; and
sending, to at least one of the network resource provider or the network computing provider, the indication of which of the remote process or the local process completed first.

7. The method as recited in claim 6, wherein the executing the local process is in response to parsing the data.

8. The method as recited in claim 6, further comprising parsing the data by processing at least one instruction included in the data to implement an application programming interface (API) on the client computing device for communicating with the network computing provider to send the remote processing request and to receive the results from the network computing provider.

9. The method as recited in claim 8, wherein the at least one instruction included in the data to implement the API is a markup language instruction that causes execution of a script to implement the API.

10. The method as recited in claim 6, wherein processing the data includes executing the local process as a first processing thread and executing sending the remote processing request as a second processing thread, separate from the first processing thread.

11. The method as recited in claim 6, wherein the remote processing request instructs the network computing provider to obtain a plurality of executable instructions associated with the remote process as the remote process information to be executed by the network computing provider to provide a processing result to the client computing device.

12. The method as recited in claim 6, wherein the remote processing request instructs the network computing provider to obtain the remote process information including a plurality of executable instructions associated with the remote process from at least one of the network resource provider or a network storage location.

13. The method as recited in claim 6, wherein the remote processing request includes one or more parameters to be used by the network computing provider during execution of the remote process.

14. The method as recited in claim 6, wherein the remote processing request instructs the network computing provider to execute the remote process using remote data maintained in a storage location remote from the client computing device.

15. The method as recited in claim 6, further comprising, prior to sending the remote processing request, acquiring execution location information that indicates that the remote process is to be executed remotely based at least in part on a type of the client computing device.

16. A system comprising:
one or more processors maintained by a network computing provider; and
one or more non-transitory computer readable media in communication with the one or more processors, the one or more non-transitory computer readable media maintaining instructions executable by the one or more processors to perform operations that include:
sending, to a client device, location execution information indicating whether particular processes are to be executed locally by the client computing device or remotely by the network computing provider;
receiving a request from the client computing device for execution of a particular process, by the network computing provider, as a remote process;
in response to the request from the client computing device, sending a request for remote process execution information, the remote process execution information including:
instructions for performing the remote process; and
a location at a network storage provider that stores remote process data for execution of the remote process;
accessing the remote process data at the location of the network storage provider included in the remote process execution information;
executing the remote process based, at least in part, on the remote process execution information and the remote process data to produce a processing result; and
sending the processing result to the client computing device.

17. The system as recited in claim 16, the remote process execution information is specified within the request from the client computing device.

18. The system as recited in claim 16, the network computing provider further comprising a management component and a plurality of network computing components, the management component executable on at least one of the one or more processors to select one or more of the network computing components of the plurality of network computing components to execute the remote process.

19. The system as recited in claim 18, wherein the management component selects a network computing component that is preconfigured with a library including one or more executable code segments to be used during execution of the remote process.

20. The system as recited in claim 18, wherein the operations further include:
receiving a plurality of remote processes; and
at least a first one of the plurality of network computing components is preconfigured with a first library of executable code segments useable during execution of a first remote process of the plurality of remote processes and at least a second one of the plurality of network computing components is preconfigured with a second library of executable code segments useable during execution of a second remote process of the plurality of remote processes.

21. The system as recited in claim 16, further comprising remote process data stored on the non-transitory computer-readable media and accessible by the one or more processors to execute the remote process, wherein at least a location of the remote process data is received from the network resource provider.

22. A computing device comprising:
a processor;
a non-transitory computer readable medium coupled to the processor;
an application maintained on the non-transitory computer-readable medium and executable on the processor to perform operations to include:
downloading data representing a webpage from a network resource provider;
determining, based on interpreting the data and without further input from a user, that the data includes instructions to make a remote process call on a network computing provider and instructions to make a local process call on the computing device;
executing the instructions to make the remote process call to cause the computing device to send a remote processing request to the network computing provider, the remote processing request instructing the network computing provider to use remote process information available from the network resource provider for executing the remote process;
receiving a processing result from the remote process executed on the network computing provider;
executing the instructions to make the local process call on the computing device to generate a local processing result; and
providing data for display based, at least in part, on one of the processing result from the remote process executed on the network computing provider or the local processing result on the computing device that completes first.

23. The computing device as recited in claim 22, wherein the operations further include providing the processing result from the remote process to the local process.

24. The computing device as recited in claim 22, wherein:
the application processes the webpage to display content associated with the webpage on the computing device; and
the remote process completes first and the application utilizes the processing result of the remote process to display the content associated with the webpage.

25. The computing device as recited in claim 22, wherein the providing for display comprises:
providing portions of the data for rendering in an order in which the processing result from the remote process executed on the network computing provider and the local processing result become available.

26. A computing device comprising:
a processor;
a non-transitory computer-readable medium coupled to the processor; and
an application maintained on the computer-readable medium and executable on the processor to perform operations to include:

downloading data representing a webpage from a network resource provider;

in response to processing of the data and without further input from a user, identifying a process to be executed;

acquiring, from an execution location service, execution location information that indicates, based at least in part on a type of the identified process, that the identified process is to be executed locally on the computing device or remotely at a network computing provider;

determining, based at least in part on the execution location information, to execute at least a portion of the process remotely at the network computing provider and to execute at least a portion of the process locally on the computing device;

sending instructions to the network computing provider to remotely execute the at least the portion of the process based at least in part on the execution location information;

receiving a processing result of the at least the portion of the process from the network computing provider and the at least portion of the process from the computing device, the processing result indicating which of the process from the network computing provider or the process from the computing device completed first;

providing data for display, the data for display being based at least in part on the processing result received from the network computing provider.

27. The computing device as recited in claim 26, wherein the execution location information is acquired at least in part from the network computing provider that includes the execution location service.

28. The computing device as recited in claim 26, wherein the execution location information is acquired at least in part from the network resource provider that includes the execution location service and provided the network resource.

29. The computing device as recited in claim 26, wherein the execution location service provides the execution location information based, at least in part, on aggregated data collected from a plurality of computing devices that have previously executed the process.

30. The computing device as recited in claim 26, wherein the execution location information is acquired at least in part from an examination of at least one computing resource of the computing device, the at least one computing resource comprising at least one of:
   processing capability;
   memory size;
   mass storage capacity; or
   network connectivity.

31. The computing device as recited in claim 26, wherein the execution location information is based at least in part on a type or class of the computing device.

32. The computing device as recited in claim 26, further comprising:
   causing local execution of another process specified in the data as a web worker.

* * * * *